UNITED STATES PATENT OFFICE.

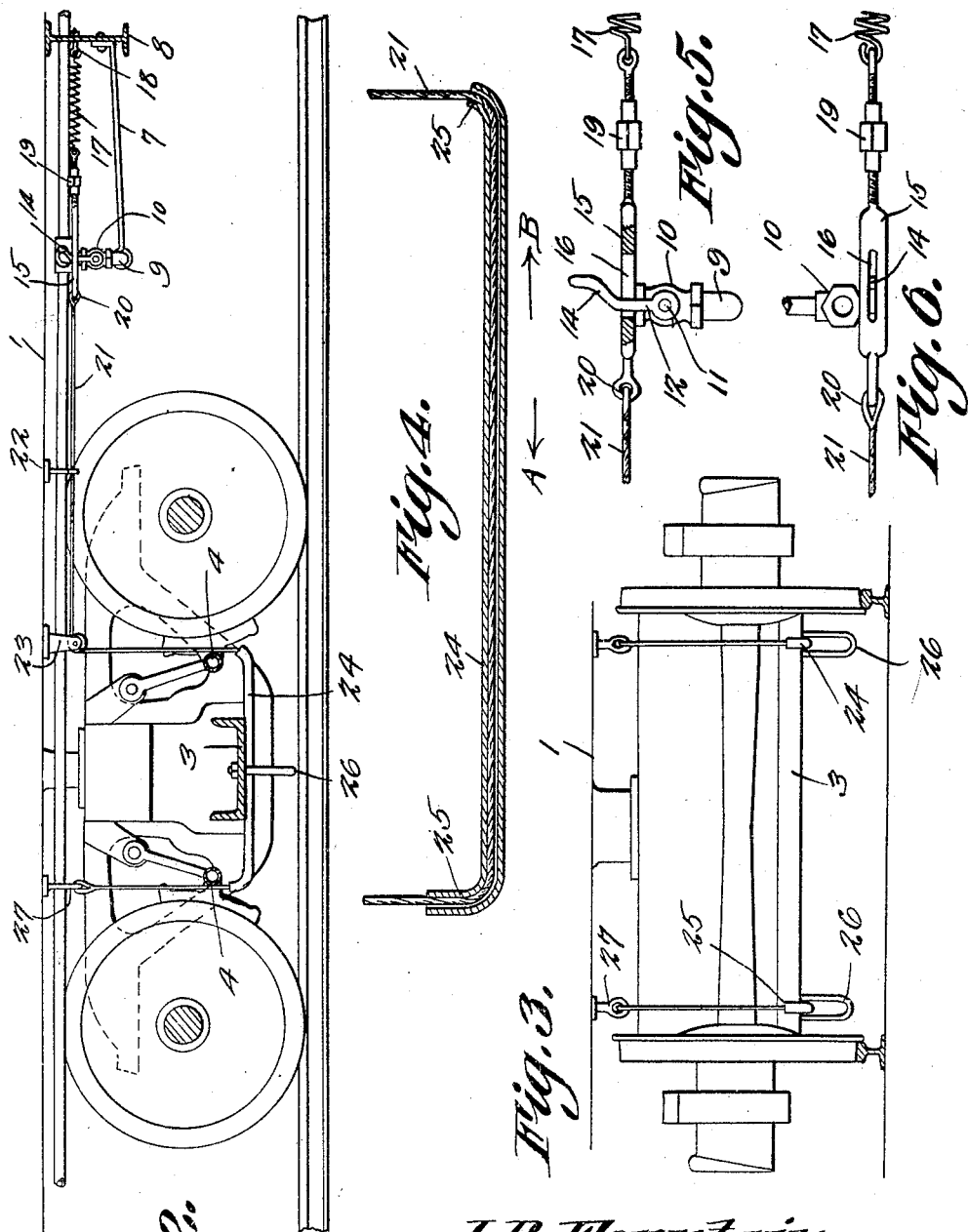

JOSEPH B. FOUNTAIN AND JOHN B. PARKER, OF LAKELAND, FLORIDA.

EMERGENCY-AIR-BRAKE ATTACHMENT.

1,382,900.         Specification of Letters Patent.    Patented June 28, 1921.

Application filed January 5, 1921. Serial No. 435,220.

*To all whom it may concern:*

Be it known that we, JOSEPH B. FOUNTAIN and JOHN B. PARKER, citizens of the United States, residing at Lakeland, in the county of Polk, State of Florida, have invented a new and useful Emergency-Air-Brake Attachment, of which the following is a specification.

This invention aims to provide a simple but efficient means whereby, when the spring support or other portion of a car truck falls, a reduction of train pipe pressure will be brought about, thereby effecting a setting of the brakes automatically.

It is within the province of the disclosure to improve generally and to enhance the utility of devices of that type to which the invention appertains.

We do not bind ourselves to the precise construction shown in the drawings and hereinafter described, since, within the scope of what is claimed, a mechanic may work changes, without departing from the spirit of the invention.

In the drawings:—Figure 1 shows in bottom plan, a portion of a railroad car equipped with the device forming the subject matter of this application; Fig. 2 is a side elevation; Fig. 3 is an end elevation; Fig. 4 is a longitudinal section showing one of the conduits through which the flexible actuating members pass; Fig. 5 is an elevation disclosing the valve and attendant parts; Fig. 6 is a plan of the structure shown in Fig. 5.

The numeral 1 marks the frame of a car, the air brake train pipe appearing at 2. The spring support of the truck is shown at 3, and the brake beams at 4.

A cross 5 is interposed in the train pipe 2, and branches 6 extend laterally from the cross, the branches being sustained by braces 7 extending from a cross beam 8, forming part of the frame 1. Each branch 6 has an upstanding end 9 carrying a valve casing 10. The stem of the valve in the casing 10 is denoted by the numeral 11 and carries an upstanding arm 12 including an inclined portion 14.

An actuating member for the valve is provided, the said member being operated by the dropping of sundry parts of the truck, for instance, the spring support 3 or the brake beams 4. The actuating member is a composite structure and includes a bar 15 having an elongated slot 16 wherein the arm 12 of the valve is received. The numeral 17 designates a retractile spring secured at one end, as indicated at 18, to the beam 8, the other end of the spring being connected by an adjusting device to one end of the bar 15. The adjusting device may be in the form of a turn buckle 19, if desired.

The actuating member for the valve includes a flexible element 21, connected at one end, as at 20, to the bar 15. The flexible element 21 is received slidably in any desired number of guides 22 on the frame 1 of the car. The flexible element 21 is rove to a guide 23 on the frame, the guide being a pulley, ordinarily. From the pulley 23, the flexible element 21 extends downwardly, and horizontally through a rigid conduit 24, the ends 25 of which are upturned to prevent a cutting or fraying of the flexible element. The flexible element extends upwardly from the conduit 24 and is anchored, as at 27, to the car frame 1. The conduit 24 extends beneath the spring support 3 of the truck and is received slidably in a guide 26 which is mounted on the spring support. A U-bolt will form a satisfactory guide, at the point alluded to.

Although the description has proceeded in the singular number, it will be obvious from an inspection of the drawings, that each side of the car has a mechanism of the sort hereinbefore set forth.

In practical operation, when the spring support 3, the beams 4 or other parts of the truck drop, at either side of the truck, the corresponding conduit or stiffening member 24 will move downwardly, a pull being imparted to the flexible element 21. The bar 15 is moved endwise, the valve is placed in open position, through the instrumentality of the handle 12, a reduction of train pipe pressure occurs, and the brakes are set automatically.

Owing to the fact that the handle 12 has an offset portion 14, a quick movement will be imparted to the handle, and consequently to the valve, by the bar 15, the handle swinging downwardly through the slot 16, clear of the bar 15. The bar 15 moves in the direction of the arrow A in Fig. 5, when train pipe pressure is reduced automatically. If, for any reason, the bar should happen to move in the direction of the arrow B, after train pipe pressure has been reduced, the motion will not be transmitted to the handle 12, and the valve will not be closed, because the handle is below and independent of the bar. The mechanism can be reset only by swinging the handle 12, by hand, upwardly through the slot 16.

The spring 17 serves to take up slack in the flexible element 21, and the spring may be adjusted by means of the turn buckle 19 or its equivalent.

As shown in Fig. 5, the handle 12 ordinarily stands spaced from both ends of the slot 16. Consequently, although the bar 15 may work endwise, the handle 14 will not be operated, and the valve opened, unless the dropping of some part of the truck imparts a considerable movement to the parts 21 and 15.

The structure is simple and not likely to get out of order, especial attention being directed to the fact that there are few pipes, and but one interruption in the train pipe 2. It is a matter of common knowledge among car builders and mechanics that the fewer joints there are in a train pipe, to leak, the better.

We claim:—

1. In a device of the class described, a car frame; a truck; a train line brake pipe; a valve in the pipe; an actuating member extended beneath a part of the truck and operatively connected intermediate its ends with the valve; means for anchoring one end of the actuating member to the frame; and resilient means for connecting the other end of the actuating member to the frame.

2. A device of the class described, constructed as set forth in claim 1, and further characterized by the provision of mechanism for adjusting the resilient means.

3. In a device of the class described, a car frame; a truck; a train line brake pipe; a valve in the pipe; a stiffener extended beneath a part of the truck; an actuating member connected to the valve and slidable in the stiffener; and means for anchoring one end of the actuating member to the frame.

4. In a device of the class described, a car frame; a truck; a train line brake pipe; a valve in the pipe; an actuating member extended beneath a part of the truck and including a slot; an arm on the valve, the arm being received in the slot and being provided with an offset cam portion coöperating with the actuating member at one end of the slot to swing the arm clear of the actuating member; and means for connecting the ends of the actuating member to the frame, one of said means being resilient.

5. In a device of the class described, a car frame; a truck; a train line brake pipe; a valve in the pipe; a guide on the truck; a stiffener movable in the guide and extended beneath a portion of the truck; a flexible element slidable in the stiffener; means for securing one end of the flexible element to the frame; a bar attached to the other end of the flexible element and provided with a slot; a spring secured to the frame; an adjustable connection between the spring and the bar; and a handle on the valve and received in the slot.

In testimony that we claim the foregoing as our own, we have hereto affixed our signatures in the presence of two witnesses.

JOSEPH B. FOUNTAIN.
JOHN B. PARKER.

Witnesses:
FULDA L. SEARCH,
MASON B. LAWTON.